April 16, 1968  E. PATTERSON, JR  3,377,873
COUNTERWEIGHT OR THE LIKE FOR GEROTOR GEAR SET
Filed Dec. 8, 1965  2 Sheets-Sheet 1

INVENTOR.
EARL PATTERSON, JR.
BY Wayne B. Easton
ATTORNEY

April 16, 1968     E. PATTERSON, JR     3,377,873
COUNTERWEIGHT OR THE LIKE FOR GEROTOR GEAR SET
Filed Dec. 8, 1965     2 Sheets-Sheet 2

INVENTOR.
EARL PATTERSON, JR.
BY Wayne B. Easton
ATTORNEY

United States Patent Office 3,377,873
Patented Apr. 16, 1968

3,377,873
COUNTERWEIGHT OR THE LIKE FOR GEROTOR GEAR SET
Earl Patterson, Jr., Excelsior, Minn., assignor to Char-Lynn Company, Eden Prairie, Minn., a corporation of Minnesota
Filed Dec. 8, 1965, Ser. No. 512,445
7 Claims. (Cl. 74—86)

ABSTRACT OF THE DISCLOSURE

A gerotor gear set having an outer ring member with internal teeth and an eccentrically disposed meshing star gear having rotatable and orbital motion relative to the ring member, the star gear having a bore therein with a rotatable member disposed in the bore whereby the rotatable member is adapted to rotate and orbit in the star gear in synchronism with the star gear.

---

This invention relates to gerotor type gear sets and more particularly to a counterweight or the like for a gerotor type gear set and means for driving the counterweight or the like.

A gerotor type gear set comprises a ring gear having internal teeth and an eccentrically disposed meshing star gear having at least one less tooth than the ring gear. In a particular type of gerotor gear set the star gear has both a rotational and orbital movement relative to the ring gear. The orbital movement of the star gear relative to the ring gear creates an unbalanced centrifugal force relative to the axis of the ring gear which is undesirable in some gerotor type devices. The present invention is directed specifically to a drive and counterweight combination which functions to balance the centrifugal force referred to. More generally, however, it is within the scope of the invention that the element of the combination represented by the counterweight may have an additional function such as the function of a valve or, if desired, the element may have one or more functions which would not include the counterweighting function. From the standpoint of the scope of the invention, therefore, the element which is illustrated herein as being a counterweight has a particular mechanical relationship to the star gear and it is that particular mechanical relationship and the manner in which that element is driven relative to the star gear that the invention is directed to generally.

It is a main object of the present invention to provide a new and improved gerotor gear set having a novel counterweight or the like and novel means for driving the counterweight or the like.

Other objects and advantages will become apparent from the following specification, appended claims and attached drawings.

Figure 1:
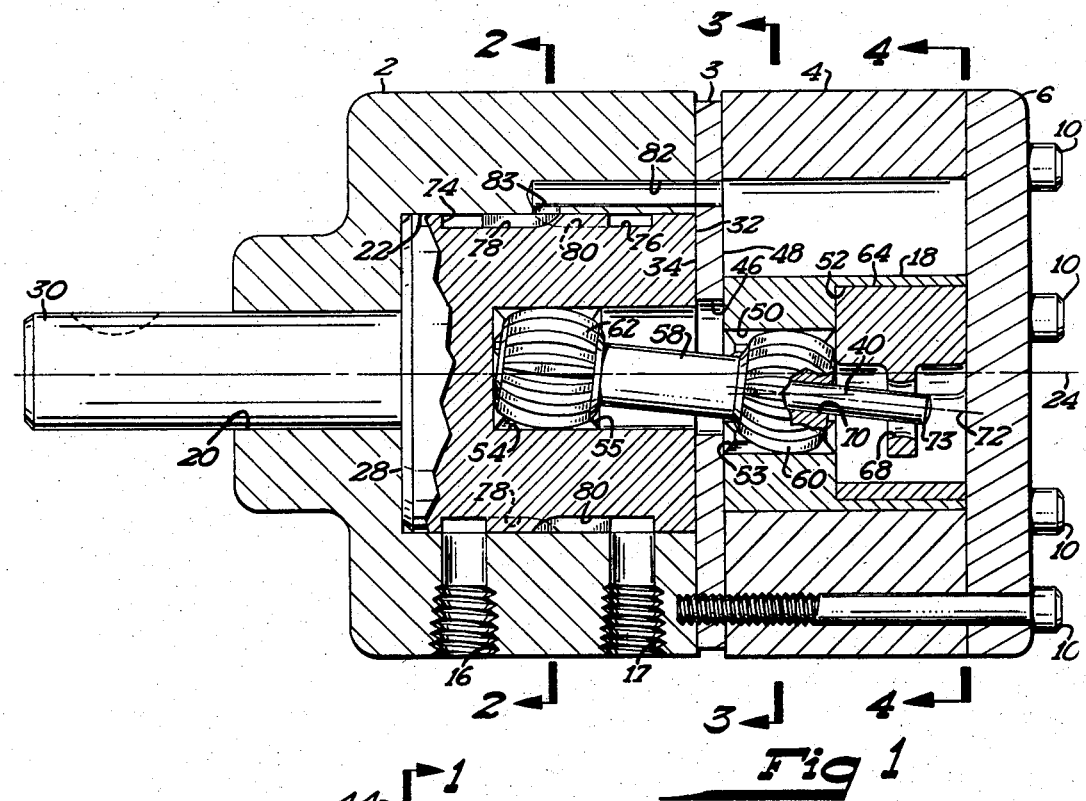
FIG. 1 is a longitudinal sectional view of a fluid pressure motor or pump embodying the invention and taken on line 1—1 of FIG. 2.

The invention is illustrated herein as being embodied in a fluid pressure device which is operable as a pump or a motor.

In the fluid pressure motor or pump illustrated there is provided a casing or housing made of several annularly and cylindrically shaped sections which are a valve casing section 2, a valve plate 3, a gerotor casing section 4 and an end cover plate 6. Casing sections 2, 3, 4 and 6 are held together in axial alignment by a plurality of circumferentially spaced bolts 10.

When the present invention is embodied in a fluid pressure device such as the pump or motor illustrated herein, the casing referred to above serves as a support or frame for one or more rotatable or orbitable members which are essential to the invention. The word "frame" as used herein and in the appended claims thus means a casing if the invention is embodied in a fluid pressure device or other relatively stationary supporting means if it is embodied in some other type of device.

The shape of gerotor casing section 4 is generally cylindrical and annular and has a plurality of internal teeth. An externally toothed star member 18 having at least one fewer tooth than casing section 4, which may be referred to as a ring member 4, has the teeth thereof in meshing engagement with the teeth of ring member 4. Star member 18 partakes of a hypocycloidal movement and travels in an orbit about the axis of ring member 4.

Valve casing section 2 has a generally cylindrical shape and has an axially extending bore 20 and a counterbore 22, both of which bores are concentric relative to the axis 24 of ring member 4. Inlet and outlet ports 16 and 17 are provided in casing section 2 which communicate with the interior of bore 22 as shown in FIG. 1, and which would be reversed for operation of the motor or pump in the opposite direction.

Rotatably disposed in valve casing section 2 is a combination valve and shaft member which comprises a cylindrically shaped valve 28 which is rotatably supported in bore 22 and shaft 30 which is rotatably supported in bore 20. Shaft 30 is an input shaft if the device is used as a pump and an output shaft if the device is used as a motor. The axial length of valve portion 28 is equal to the axial length of bore 22 so that the radial surface 32 of valve portion 28 is in slidable engagement with the adjacent radial surface 34 of valve plate 3.

Figure 3:
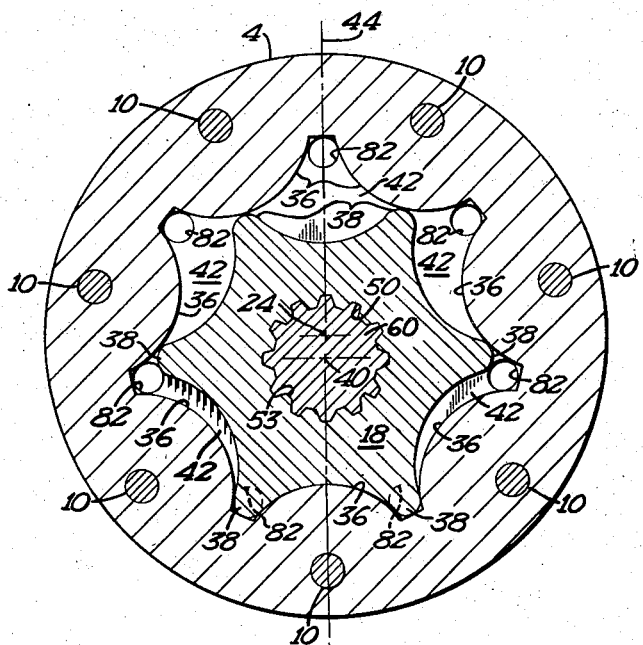
FIG. 3 is a transverse sectional view taken on line 3—3 of FIG. 1.
Figure 4:
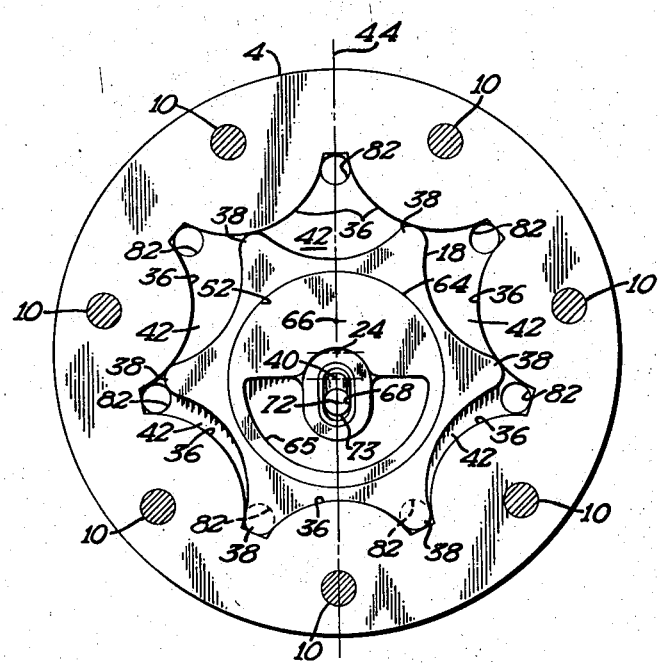
FIG. 4 is a transverse sectional view taken on line 4—4 of FIG. 1.

With reference to FIGS. 3 and 4, the gerotor casing section 4, which in effect is the ring member 4, has a plurality of internal teeth 36. Externally toothed star member 18, having at least one fewer teeth 38 than ring member 4, is disposed eccentrically in the chamber or space formed and surrounded by ring member 4. Star member 18 is moveable orbitally relative to the ring member 4 with the axis 40 of star member 18 being moveable in an orbital path about the axis 24 of ring member 4. During orbital movement of star member 18 the teeth 38 thereof intermesh with the ring member teeth 36 in sealing engagement to form expanding and contracting cells 42 which are equal in number to the number of teeth 38 of star member 18.

With further reference to FIGS. 3 and 4, a vertical centerline 44 incidentally represents the line of eccentricity for the star member 18 for that particular position of the star member relative to the ring member 4. During orbital movement of the star member 18, and assuming the orbital movement is clockwise, the cells 42 on the right side of the line of eccentricity would be expanding and the cells 42 on the left side would be contracting. If the device is used as a motor, fluid under pressure is directed to the expanding cells and exhausted from the contracting cells. If the device is used as a pump, fluid is sucked into the expanding cells and delivered under pressure from the contracting cells. The valving arrangement which facilitates the pumping or motor action will be described further on herein.

Casing plate 3 has a bore 46 which is concentric relative to the axis 24 and is small enough so that the resulting annular face 48 which abuts gerotor casing section 4, along with cover plate 6, form sides for the gerotor chamber so that the expanding and contracting cells 42 formed between the teeth of the gerotor star and ring members 18 and 4 will be closed for all orbital positions of the star member 18.

Star member 18 has a bore 50 and and a counterbore 52 which open to opposite sides of star 18 and which are concentric relative to the teeth 38 thereof. Bore 50 is provided with a plurality of circumferentially arranged, axially extending teeth or spines 53. A bore 54 of valve 28, which is concentric relative to ring axis 24 and communicates with the bore 50 of star 18, also has a plurality of circumferentially arranged, axially extending teeth or splines 55. A shaft 58 extends between and mechanically connects star 18 and valve 28 in driving relation. Heads 60 and 62 at opposite ends of shaft 58 are frusto-spherically shaped and are provided with splines which are equal in number to and mesh with splines 53 and 55 of the star and valve members 18 and 28.

Star member 18 is eccentrically disposed relative to ring member 4, as mentioned above, and shaft 58 is thus always in a cocked or tilted position relative to valve 28, which has the same axis 24 as ring member 6, and to the axis 40 of star member 18. In operation a star member 18 having six teeth will make one revolution about its own axis 40 for every six times the star member orbits in the opposite direction about the axis 24 of the ring member 4. Thus, the right end of the shaft 58 has both orbital and rotational movement in common with the star member 18 while the left end of the shaft has only rotational movement in common with valve 28.

The spline connections between shaft 58 and valve 28 on the one hand, and between shaft 58 and star member 18 on the other hand, are forms of universal joints which permit the shaft to have the motion described above. When the device is utilized as a pump, star member 18 will be orbited about ring axis 24 by a turning force applied to shaft 30 which is transmitted to star member 18 through the shaft 58. When the device is used as a motor, the force created by the orbital and rotational movement of star 18 will be transmitted through shaft 58 to shaft 30 to cause turning of shaft 30. The orbital movement of star 18 about axis 24 results in a centrifugal or radial force which star 18 exerts against ring 4 and which rotates about axis 24 at the orbital speed of star 18.

A cylindrically shaped counterweight 64 for balancing the centrifugal force referred to is carried by and rotatably disposed in bore 52 of star 18. Counterweight 64 has a generally U-shaped hole 65 formed on one side thereof which has the effect of causing the center of gravity 66 of the counterweight to be offset from the axis 40 of the star on the diametrically opposite side from the hole 65. Counterweight 64 has, diametrically opposite the center of gravity 66, a radially extending slot 68 having parallel walls which extend parallel to the star axis 40 which is also the axis of rotation of the counterweight 64 relative to star 18.

Shaft 58 has a central bore 70 concentric with the axis 72 thereof in which a shaft extension or shaft portion 73 is rotatably disposed. Shaft extension 73, which may be either fixedly or rotatably mounted in the bore 70 of the shaft 58, extends into the slot 68 of counterweight 64 and the diameter thereof is substantially equal to the width of the slot 68. With this construction and arrangement the counterweight 64 is rotated at the same speed that star 18 orbits relative to ring 4 and the center of gravity 66 of counterweight 64 is always maintained on the diametrically opposite side of axis 24 from star axis 40 which is the center of gravity of star 18. Shaft extension 73 acting in counterweight slot 68 thus causes counterweight 64 to be rotated in synchronism with the orbital speed of star 18 and to counterbalance the centrifugal or radial force created by the orbiting motion of star 18.

Axis 72 of shaft 58 and shaft portion 73 defines a conical or generally conical path while moving in synchronism with the orbital movement of star 18. As viewed in FIG. 4, shaft axis 72 is in the plane of the line of eccentricity 44 and this relationship is maintained for all positions of star 18 and shaft portion 73.

Figure 2:
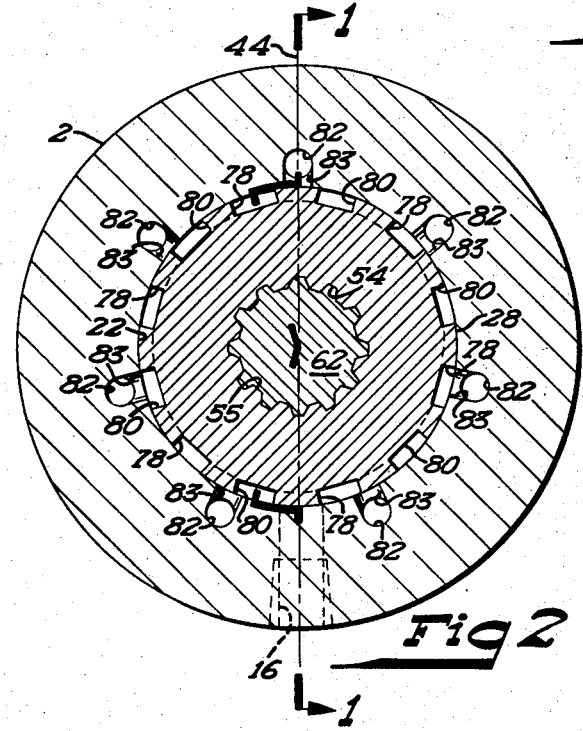
FIG. 2 is a transverse sectional view taken on line 2—2 of FIG. 1.

With regard to the valving for the pump or motor illustrated, valve 28 and casing section 2 are provided with fluid passages through which fluid is conveyed from the port 16 or 17 to the cells 42 of the gerotor and returned to the other of the ports 16 and 17. Port 16 or 17 will be the inlet, and the other the outlet port, depending on the direction of rotation desired for shaft 30. Valve 28, by reason of the shaft connection between it and star 18, will rotate at the same speed as the star 18 but in the opposite direction from the orbiting direction of the star 18. Valve 28 has two axially spaced annular channels 74 and 76 which are axially aligned with ports 16 and 17 and in respective fluid communication therewith. With reference to FIGS. 1 and 2, valve 28 has a plurality of axially extending, circumferentially arranged and spaced passages which are illustrated herein as a set of six axially extending slots 78 which are in fluid communication with annular channel 74 and port 16 and a set of six axially extending passages or slots 80, alternately spaced relative to slots 78, which are in fluid communication with annular channel 76 and port 17. In the fluid pressure device illustrated the passages 78, and the passages 80, are equal in number to the number of teeth 38 on the star 18.

Casing sections 2 and 3 have jointly formed therein a plurality of generally axially extending, circumferentially arranged and spaced passages 82 illustrated as being seven in number which is equal to the number of teeth 36 of the ring member 4. Passages 82 are connected in casing section 2 by short radial passages 83 with the interior of casing section 2 to provide for fluid communication between valve passages 78 and 80 and casing passage 82.

Upon rotation of valve 28, each of the passages 78 and 80 therein successively registers in fluid communication with each of the passages 82 in casing section 2. Fluid is supplied to and withdrawn from the gerotor through passages 82 which terminate at points which constitute junctions (see FIG. 3) between the teeth 36 of ring member 4.

Assuming that the fluid pressure device is functioning as a motor, pressurized fluid flows through inlet 16, into annular channel 74, into passages 78 in valve 28, through certain of the passages 82 in casing section 2, and certain gerotor cells 42 which, as viewed in FIG. 3, are on the right side of the line of eccentricity 44. The expansion of the cells 42 on the right side of the line of eccentricity 44 causes star 18 to gyrate in a clockwise direction and causes collapsing of the cells 42 on the left side of the line of eccentricity 44. Fluid from the collapsing cells 42 flows through casing passages 82 on the left side of the line of eccentricity 44, as viewed in FIGS. 2 and 3, through some of the valve passages 80, through valve channel 76 and out through outlet port 17. The above description of fluid flow is only for an instantaneous condition in that the line of eccentricity 44 rotates about the axis 24 of ring member 4. As long as pressurized fluid is admitted through port 16, however, the pressurized fluid will always be admitted to cells 42 on the same side of the line of eccentricity 44 and fluid will always be exhausted from cells on the other side of said line.

During orbiting of star 18 about ring member axis 24, the star rotates in the opposite direction about its own axis 40 at a slower speed. The ratio between the orbiting and rotating speeds is dependent upon the ratio between the ring and star member teeth. If that ratio is seven to six as illustrated herein the rotating speed of the star will be one-sixth of its orbiting speed. By reason of the illustrated shaft connection between star 18 and valve 28, valve 28 rotates at the same speed and in the same direction as star 18. Valve 28 is a commutating type valve in that it rotates at the same speed that star 18 rotates but it functions to supply and exhaust fluid to and from the gerotor at the orbiting frequency of the star.

It is contemplated that the present invention may also be applied to a gerotor gear set which is operated by a high speed shaft. This can be done by providing a star and counterweight arrangement as in the illustrated embodiment of the invention and a shaft extension for protating the counterweight which would extend from some portion of the high speed shaft into the slot 68 of the counterweight.

While only one embodiment of the invention is described here, it will be understood that it is capable of modification, and that such modification, including a reversal of parts, may be made without departure from the spirit and scope of the invention as defined in the claims.

What I claim is:

1. A gerotor gear set comprising relatively stationary frame means, a generally annularly shaped internally toothed ring element having an axis in fixed relation to said frame means, an externally toothed star element having at least one fewer teeth than said ring element and having a bore therein disposed eccentrically in said ring element for orbital movement about the axis of said ring element and rotational movement about its own axis in the opposite direction from and at a slower speed than said orbital movement during relative movement between said elements, a first rotatable member supported by said frame means for rotation about said ring element axis, shaft means extending between said star element and said first rotatable member to provide for rotational movement of said first rotatable member in synchronism with one of said movements of said star element, a second rotatable member carried by said star element in the bore therein and being rotatable relative thereto, and means connecting said shaft means to said second rotatable member to provide rotational movement of said second rotatable member relative to said star element axis in synchronism with said orbital movement of said star element.

2. A gerotor gear set according to claim 1 wherein said first rotatable member and said star element have mutually facing bores with said shaft means extending between and into said bores.

3. A gerotor gear set according to claim 1 wherein said second rotatable member is eccentrically weighted in the diametrically opposite direction from which said star element is eccentrically disposed in said ring element.

4. A gerotor gear set according to claim 1 wherein said shaft means has an axis which intersects said ring element axis and said star element axis, said drive mechanism including first universal joint means between said shaft means and said star element for imparting said orbital and rotational movement of said star element to said shaft means, and second universal joint means between said shaft means and said first rotatable member to effect rotation of said first rotatable member in synchronism with said rotational movement of said star element.

5. A gerotor gear set according to claim 1 wherein said second rotatable member has a radially extending slot with walls extending parallel to said ring member axis, said means connecting said shaft means to said second rotatable member being a shaft portion which extends into said slot.

6. A gerotor gear set according to claim 5 wherein said shaft portion is rotatable relative to said shaft means axis and to said second rotatable member.

7. A gerotor gear set according to claim 1 wherein said second rotatable member is a counterweight having its center of gravity on the diametrically opposite side of said ring element axis relative to said star element axis for all orbital positions of said star element.

References Cited

UNITED STATES PATENTS 3,288,034    11/1966    White et al. _____ 103—130 X

FRED C. MATTERN, JR., *Primary Examiner.*

W. S. RATLIFF, *Assistant Examiner.*